United States Patent Office 2,848,869
Patented Aug. 26, 1958

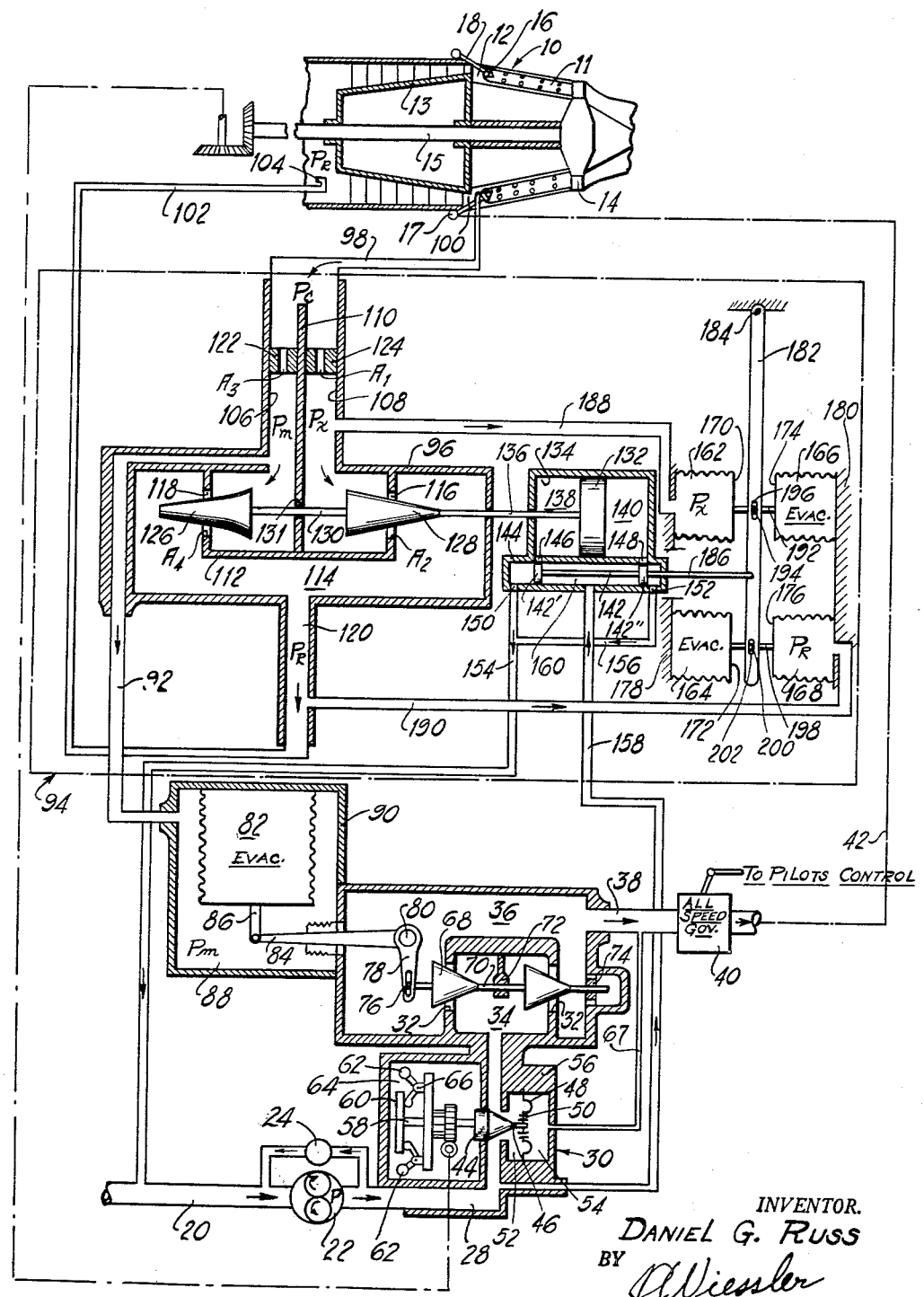

2,848,869

FUEL CONTROL SYSTEM FOR GAS TURBINE ENGINES

Daniel G. Russ, South Bend, Ind., assignor to Bendix Aviation Corporation, South Bend, Ind., a corporation of Delaware Application October 26, 1953, Serial No. 388,293

30 Claims. (Cl. 60—39.28)

This invention relates to a fuel feed and power control system for gas turbine engines and more particularly for gas turbine engines adapted for the propulsion of aircraft, such as those now commonly known as turbo-jet and turbo-prop engines.

In acceleration of gas turbine engines a phenomenon known as compressor stall or surge may be encountered in which the pressure ratio of the compressor exceeds some critical value at any given speed, which usually results in a sudden and drastic reduction of compressor pressure ratio and air flow delivered, and/or in sustained pulsations of these quantities. If such a condition is encountered, the burner temperatures and the vibratory stresses induced in the compressor may become sufficiently high to cause serious damage to the engine unless the condition is alleviated by suitable power control action, such as by an immediate and sharp reduction in the fuel delivery to the engine. In many present day high compression, high efficiency gas turbine engines it has been found that the stall or surge characteristic of the engine compressor requires limiting the fuel flow supplied to the engine throughout the greater part of the range of acceleration. Many of the fuel controls now in use on such engines include a mechanism which schedules the fuel flow during acceleration such that the compressor stall region for the particular engine is avoided. Experience in this art, however, has been such, that in order to avoid the compressor stall region during engine acceleration by means of a relatively simple control system, a substantial safety margin must be provided which necessarily decreases the rate at which the engine can be accelerated, particularly since the compressor stall region varies over a relatively wide range with variations in engine operating conditions. On the other hand, some controls have been designed which may more closely meet the compressor limitations but which are of such inherent complexity as to make them impractical for commercial use or involve great difficulties in manufacture, maintenance, dependability of operation, and the like.

One of the principal reasons which has heretofore determined the relatively complex nature of fuel controls of the latter mentioned type is that such controls have incorporated relatively complex, and in many cases unreliable, temperature sensing mechanisms to meet the changes in the compressor stall characteristic which results with changes in engine inlet temperature. It has been found that, if fuel is metered to an engine of the type specified in accordance with the relation $$W_f = P_R N \cdot f_1 \frac{(P_c)}{(P_R)}$$

or in accordance with the relation $$W_f = P_c N \cdot f_2 \frac{(P_c)}{(P_R)}$$

where $W_f$ denotes the metered fuel flow to the engine burners, $P_R$ denotes total compressor inlet or ram pressure, $N$ denotes engine rotational speed, $f_1$ and $f_2$ designate certain predetermined functions which may be varied as required, and $P_c$ denotes a pressure which exists at some stage of the compressor, preferably on the discharge side thereof, the engine may be accelerated so as to just avoid a compressor stall or surge condition at all engine operating conditions without the necessity of any temperature sensing whatever. The terms $f_1$ and $f_2$ are empirical functions which may be incorporated into the metering device to modify the acceleration fuel flow to satisfy the variation in requirements that occur between different engine designs.

It is therefore one of the principal objects of the present invention to provide a relatively simple fuel control system for gas turbine engines which will permit a substantially optimum acceleration rate throughout the entire operating range of the engine.

Another object of this invention is to provide a simplified fuel control system which meters fuel to the engine as a function of a certain engine parameter which uniquely defines the compressor stall characteristic at all engine operating conditions; i. e. to meter fuel to the engine in accordance with the relation $$W_f = P_c N \cdot f_2 \frac{(P_c)}{(P_R)}$$

Another object of this invention is to provide a simplified fuel control system which meters fuel to the engine as a function of a certain engine parameter which uniquely defines the compressor stall characteristic at all engine operating conditions; i. e. to meter fuel to the engine in accordance with the relation $$W_f = P_R N \cdot f_1 \frac{(P_c)}{(P_R)}$$

A further object of this invention is to provide a fuel control system for engines of the type specified which is adapted to meter fuel to accelerate the engine at a substantially optimum rate at all engine operating conditions without compressor surge or stall and without the necessity of sensing that temperature condition according to which the characteristic of compressor surge or stall varies.

Another object of this invention is to provide a fuel control system for engines of the type specified wherein a flow regulating valve varies fuel flow to the engine as a function of a modulated pressure which is controlled by a pressure generator to vary as some predetermined function of compressor pressure ratio.

An additional object of this invention is to provide a fuel control system for engines of the type specified which meters fuel to the engine as a function of a certain engine parameter which uniquely defines the compressor stall characteristic at all engine operating conditions and which is of such inherent versatility that engines having different compressor stall characteristics may be controlled, if minor design changes are made in the mechanism to be described, to accelerate along the compressor stall limit.

Another and more specific object of this invention is to provide a fuel control system for engines of the type specified wherein a compressor surge or stall fuel control valve is controlled to meter accelerating fuel flow at all engine operating conditions so as to optimize the rate of engine acceleration and avoid compressor surge or stall, and wherein said fuel valve is controlled as a function of a modulated fluid pressure which is biased to vary as a predetermined function of compressor pressure ratio.

The foregoing and other objects and advantages will become apparent in view of the following description taken in conjunction with the drawing wherein a schematic sectional view of a device of the type specified is illustrated.

Referring now to the drawing, a gas turbine engine is generally indicated at 10 which includes a series of combustion chambers 11 mounted in a casing having an air intake section 12. A compressor is indicated at 13 and is shown as an axial flow type, driven by means of a turbine 14 through a drive shaft 15. Each of the combustion chambers is provided with a burner nozzle 16, to which metered fuel is supplied under pressure by way of a fuel manifold 17 and individual fuel lines 18. Fuel is supplied to the manifold 17 from a supply source, not shown, through conduits 20 and 28, a chamber 34, metering orifice 32, a chamber 36, and conduits 38 and 42. A pump 22, which is illustrated as a gear type positive displacement pump having a constant discharge pressure regulator valve 24 in a pump by-pass conduit 26, but which may be of the variable displacement type such as is illustrated in the copending U. S. application of Frank C. Mock Serial No. 103,807, filed July 9, 1949 (common assignee), now abandoned, is disposed in conduit 20 and discharges fuel at constant pressure into conduit 28 and thence through a speed head regulator 30, also disposed in conduit 28, which controls a pressure differential across the metering orifices 32 as a function of engine speed. An engine all-speed governor, which is herein, diagrammatically illustrated at numeral 40, is disposed intermediate the conduits 38 and 42 and may be of the isochronous type as illustrated in Figure 2 of the copending U. S. application of James M. Eastman, Serial No. 263,266, filed December 26, 1951 (common assignee), or may be of the proportional type such as is illustrated at numeral 22, Figure 2, of the copending U. S. application of Frank C. Mock, Serial No. 276,791, filed March 15, 1952 (common assignee).

The speed head regulator 30 comprises a reciprocable fuel valve 44 disposed in the fuel conduit 28 and having an extension 46 at the one end thereof suitably connected to a diaphragm 48 in which are disposed calibrated restrictions 50, said diaphragm forming chambers 52 and 54 on either side thereof within a housing 56; a stem 58 extends from the opposite side of the valve 44 to which is suitably attached a flange 60. A pair of engine driven metering head generating centrifugal weights 62 are suitably disposed in a chamber 64 of the housing 56, said weights being pivoted at 66 and adapted to impose a force on the valve 44 in a valve opening direction through the flange 60 and stem 58. The chamber 52 is vented to the fuel in conduit 28 at chamber 34 pressure and communicates with chamber 54 through restrictions 50, said latter chamber being in communication with chamber 36 through conduits 67 and 38. The diaphragm 48 responds to the pressure drop across metering restrictions 32 and acts on the valve 44 in a valve closing direction to oppose the action of the weights 62. At any given engine speed the pressure drop which exists across diaphragm 48, and therefore across the metering restrictions 32, produces a force on said diaphragm which is equal and opposite to the centrifugal force output of the weights 62 thereby establishing an equilibrium condition of the valve 44. If, for any reason, there should be a variation in engine speed, the effective centrifugal force output of the weights 62 will vary in proportion to the square of the engine speed variation to effect repositioning of the valve 44 in such a manner that the pressure drop across diaphragm 48 varies as required to again produce equilibrium with the weights 62 and fix a new position of valve 44. It is therefore apparent that the speed head regulator 30 functions to vary the pressure drop across metering restrictions 32 proportional to the square of existing engine speed and that, since fuel flow varies as the square root of the pressure drop across any given area, the flow through restrictions 32 will vary in direct proportion to engine speed.

The effective area of the metering restrictions 32 is controlled by a reciprocable double seated metering valve 68 having an axially disposed stem 70 supported by bearing members 72 and 74 and suitably connected at 76 to a slotted lever member 78 which is pivotally secured on a rotatable shaft 80, in turn suitably connected to an evacuated bellows member 82 by a lever 84 and a bellows stem 86. The expansible bellows 82 is disposed in a chamber 88 of a bellows housing 90 and is anchored at one end thereof on said housing and movable at the opposite end thereof for controlling the effective metering position of the valve 68, and therefore the area of restrictions 32, as a function of a modulated pressure $P_m$ to which the chamber 88 is vented by way of a conduit 92. During an acceleration of the engine the all-speed governor 40 functions to restrict fuel flow thereto only after the engine has attained the new selected speed, it therefore being apparent that during such an acceleration the fuel flowing to the burner nozzles 16 is controlled solely as a function of the effective metering area of restrictions 32 and the metering head thereacross which vary as modulated pressure and engine speed respectively; i. e. $W_f \propto P_m N$.

The modulated pressure $P_m$ contained within chamber 88 may be controlled to vary directly as compressor inlet pressure $P_R$ times a predetermined function of compressor pressure ratio $$\frac{P_c}{P_R}$$

or directly as $P_c$ times a different predetermined function of compressor pressure ratio; i. e. $P_m$ may vary as $$P_R \cdot f_1 \frac{(P_c)}{(P_R)}$$

or as $$P_c \cdot f_2 \frac{(P_c)}{(P_R)}$$

where $$P_R \cdot f_1 \frac{(P_c)}{(P_R)} = P_c \cdot f_2 \frac{(P_c)}{(P_R)}$$

The control mechanism which is adapted to vary $P_m$ in the desired manner is shown enclosed within the blocked out portion 94 and may be referred to as a pressure generator which modulates a fluid pressure to vary as a fluid pressure times a predetermined function of a pressure ratio, hereinafter referred to simply as a pressure generator.

The pressure generator includes a main valve housing 96 connected at one end thereof to a conduit 98 which terminates in a total pressure pick-up passage 100 preferably disposed within the burner entrance section 12 at the discharge side of the compressor 13, as shown, and which is connected at its opposite end to a conduit 102 which terminates in a total pressure pick-up passage 104 suitably disposed within the inlet passage to the compressor. The conduit 98 communicates with the conduit 102 through parallel passages 106 and 108 formed within the control housing 96 by a webbed section 110 and control orifice housing 112, said parallel passages being reunited in a chamber 114 downstream of two control orifices 116 and 118 having variable effective areas $A_2$ and $A_4$ respectively, and said chamber 114 being connected to conduit 102 through a passage 120 in the housing 96. The passage 106 houses a calibrated restriction 122 having a fixed area $A_3$ and the passage 108 houses a restriction 124 having a fixed area $A_1$. The effective area of the orifice 118 is controlled by a contoured valve member 126 which is rigidly connected to a second contoured valve member 128, adapted to control the effective area or orifice 116, by means of a reciprocable rod 130 which passes through a pressure sealed aperture 131 in webbed section 110 and is axially aligned with valves 126 and 128. The valves 126 and 128 are positionally controlled by a servo-motor member 132 reciprocably disposed within a cylinder 134 and rigidly connected to the valve 128 by a rod 136. The member 132 forms chambers 138 and 140 on either side thereof and is positionally controlled within the cylinder 134 by a servo or pilot valve 142 which is reciprocably disposed within a servo valve cylinder 144 having control ports 146 and 148 suitably positioned with respect to servo valve lands 142' and 142" respectively and drain ports 150 and 152 connecting the closed ends of cylinder 144 to the low pressure interconnected drain lines 154 and 156 respectively, said drain lines communicating with the pump inlet low pressure supply conduit 20. A high pressure servo fluid supply conduit 158 connects a chamber 160 between the servo valve lands to conduit 28 at pump discharge pressure.

A bank of bellows 162, 164, 166 and 168, having movable ends 170, 172, 174 and 176 respectively and anchored to the facing abutments 178 and 180, as shown, are conjointly operable to control the servo valve 142, and therefore servo motor 132 and valves 126 and 128, by means of a suitable connection to a lever member 182 which is fulcrumed at 184 and connected to the servo valve by a stem or rod 186. All said bellows may be arranged so as to respond to atmospheric pressure, the bellows 164 and 166 being evacuated to cancel out the effect of changes in atmospheric pressure on the operation of the bellows 162 and 168. The bellows 162 communicates with conduit 108 at pressure $P_x$ through a passage 188, whereas bellows 168 communicates with conduit 120 at pressure $P_R$ through a passage 190. The bellows 162 and 166 are connected to the lever 182 by means of a rigid member 192 and a pin 194 disposed in a slotted section 196 of said lever, while the bellows 164 and 168 are similarly connected to the lever 182 by means of a member 198 and pin 200 which is disposed in a second slotted section 202 of said lever. The conduit 92 connects modulated pressure chamber 88 with conduit 106 intermediate restrictions 122 and 118.

That portion of the pressure generator 94 just described which includes the bank of bellows vented as shown and the operative connection of said bellows to the control valve 128 may be referred to as a pressure ratiometer and is disclosed and claimed in the copending U. S. application of Robert G. Rose, Serial No. 386,362, filed October 15, 1953 (common assignee).

The control valve 128 is controlled by the servo mechanism hereinbefore described in such a manner that the pressure ratio $$\frac{(P_x)}{(P_R)}$$

across orifice 116 is maintained at a predetermined constant value. It has been found that (see copending application of Robert G. Rose, supra) with two restrictions in series, such as restrictions 124 and 116, in a conduit which is vented at one end thereof to a source of variable high fluid pressure ($P_c$) and at the opposite end thereof to a source of variable low fluid pressure ($P_R$), control of the ratio of fluid pressures across the second series restriction to a substantially constant value results in the ratio of the areas $$\frac{A_2}{A_1}$$

being equal to and variable only as a predetermined function of the ratio of the source pressures $$\frac{P_c}{P_R}$$

Referring to the legend of the drawings, this relationship may be expressed in the following form:

$$\frac{A_2}{A_1} = f_3 \frac{(P_c)}{(P_R)}$$

when $$\frac{P_x}{P_R}$$

equals a constant, where $f_3$ denotes a predetermined functional relation.

This relationship has been utilized in the design of the pressure generator 94 so that the degree of displacement of the servo motor member 132 and of the interconnected valves 126 and 128 relative to orifice areas $A_4$ and $A_2$ respectively, is always a predetermined function of the compressor pressure ratio $$\frac{(P_c)}{(P_R)}$$

which function may be varied as desired by suitable contouring of valves 126 and 128.

To effect this mode of operation, each of the bellows 162, 164, 166 and 168 is shown as having the same effective area whereby the controlled constant pressure ratio $$\frac{P_x}{P_R}$$

is proportional to the ratio of the moment arms of bellows 168 and bellows 162 about the fulcrum 184. The particular desired value of pressure ratio $$\frac{P_x}{P_R}$$

for any given installation is selectable and may, for example, be varied as desired by changing the ratio of said moment arms and/or the area ratio of the bellows 168 and 162. If with the illustrated arrangement, the all-speed governor 40 is set by the pilot to a higher selected speed, fuel flow to the engine will immediately increase initiating acceleration thereof and pressure $P_c$ will increase at a rate which is a function of engine speed and the existant pressure and temperature conditions in the inlet section of the compressor 13. During acceleration of the engine, pressure $P_x$ tends to increase but the bellows 162, which is responsive to any increment of change in pressure $P_x$, momentarily overcomes the bellows 168 and moves lever 182 out of its equilibrium position thereby moving the servo valve 142 rightwardly which vents chambers 140 and 138 to the high pressure fuel in conduit 158 and to pump inlet pressure in conduit 154 respectively, whereby the servo motor member 132 moves leftwardly to increase area $A_2$ and reduce pressure $P_x$ to re-establish equilibrium of the bank of bellows and to reset the servo valve 142 to neutral position. Whenever the servo valve 142 is in a neutral position the areas $A_2$ and $A_4$ are constant.

If the pressure $P_c$ should decrease for any reason, as during an engine deceleration, the reverse of the foregoing mode of operation occurs and a new and lesser ratio $$\frac{A_2}{A_1}$$

is established. Likewise, an increase or decrease in the pressure $P_R$ will momentarily upset the equilibrium of the servo mechanism resulting in a resetting of the valve 128 in such a manner that the pressure ratio $$\frac{P_x}{P_R}$$

is maintained constant. From the above it is also apparent that any simultaneous change in pressures $P_c$ and $P_R$, in the same or opposite senses, results in an actuation and control of the servo valve 142 which repositions valve 128 in such a manner that the pressure ratio $$\frac{P_x}{P_R}$$

is always maintained at a substantially constant and predetermined value.

Since, as hereinbefore explained, the area ratio $$\frac{A_2}{A_1}$$

is equal to a function of the compressor pressure ratio $$\frac{P_c}{P_R}$$

whenever the pressure ratio $$\frac{P_x}{P_R}$$

is maintained constant, the area $A_2$ becomes a function of pressure ratio $$\frac{(P_c)}{(P_R)}$$

only, inasmuch as area $A_1$ is constant. Since the area $A_2$ is controlled by the valve 128 it is apparent that the linear displacement of both valves 128 and 126, and therefore the area $A_4$ of orifice 118, is equal to a function of the compressor ratio $$\frac{P_c}{P_R}$$

From the foregoing it is apparent that, at any given pressure $P_R$, control or modulated pressure $P_m$, and therefore the area of metering restrictions 32 and fuel flow to the engine, will vary in accordance with a preselected function of compressor pressure ratio. Since passage 106 at pressure $P_m$ communicates with conduit 120 at pressure $P_R$ through orifice 118, it is also apparent that the level of pressure $P_m$, at any given compressor ratio, is a function of altitude which may be expressed in terms of compressor inlet pressure $P_R$ or compressor discharge pressure $P_c$. In other words, modulated pressure $P_m$, and therefore the effective metering position of valve 68, is always a function of the quantity $$P_R \cdot f_1 \frac{(P_c)}{(P_R)}$$

or $$P_c \cdot f_2 \frac{(P_c)}{(P_R)}$$

each of which quantities may be chosen to define the compressor stall characteristic of any given engine when transiently operating at any given speed. It should be understood that said quantities may be alternatively utilized for controlling fuel flow to any given engine at the compressor surge or stall limit thereof depending on the most desirable control design. In other words, any given engine fuel control may be designed according to my invention which may utilize either of the aforesaid quantities, the selection of which would depend on the most practical control design for the particular engine under consideration. Irrespective of the parameter finally selected it should be noted that, with respect to any given engine configuration, the quantity $$P_R \cdot f_1 \frac{(P_c)}{(P_R)}$$

would always be equal to $$P_c \cdot f_2 \frac{(P_c)}{(P_R)}$$

i. e. the function $f_1$ or $f_2$ would be selected so that pressure $P_m$ would always be definitive of the particular compressor surge or stall function involved regardless of which of the aforementioned parameters was finally selected.

The selected contour of the valve 128 predetermines the particular desired function of compressor ratio which is measured in terms of displacement of the valves 128 and 126. In other words, the area $A_2$ may be varied by contouring valve 128 to establish any desired displacement of the assembly 132, 128, 126 as a function of compressor ratio $$\frac{(P_c)}{(P_R)}$$

whereas the area $A_4$ may be varied to produce any desired compressor stall function of compressor ratio by suitable contouring of valve 126, such that $$P_m = P_R \cdot f_1 \frac{(P_c)}{(P_R)}$$

or $$P_c \cdot f_2 \frac{(P_c)}{(P_R)}$$

From the above it is apparent that when the area of the metering restrictions 32 is controlled as a function of modulated pressure $P_m$ and the metering head thereacross is controlled to be proportional to the square of engine speed, that the fuel flow therethrough to the burner nozzles 16 during an engine acceleration at any conditions of pressure and temperature at the compressor inlet will be controlled to equal $$P_R N \cdot f_1 \frac{(P_c)}{(P_R)}$$

or $$P_c N \cdot f_2 \frac{(P_c)}{(P_R)}$$

By selecting the proper function of compressor ratio for any given engine configuration, the applicant's control system will meter fuel to the engine during acceleration thereof at such a rate that the engine will accelerate at or very near to the compressor stall boundary.

If the speed head regulator 30 were adapted to control the metering head across restrictions 32 as a function of altitude, in addition to control thereof as a function of engine speed, the control valve 128 could be directly or servo connected to metering valve 68 to obtain displacement thereof which would vary as a predetermined stall function of compressor ratio only, in which instance the above described control circuitry for pressure $P_m$ could be eliminated; i. e. pressure $P_m$ (or the area of metering restrictions 32) would equal $$f \frac{(P_c)}{(P_R)}$$

where $f$ denotes a predetermined compressor stall function. The copending U. S. application of Frank C. Mock, Serial No. 716,154, filed December 13, 1946 (common assignee), now Patent No. 2,689,606, dated Sept. 21, 1954, discloses altitude compensating means in Figure 2A thereof which is utilizable in combination with the speed head regulator 30 for controlling metering head as a function of altitude pressure if such an arrangement were found desirable.

With reference to the operation of the complete control system, an engine acceleration may be initiated by a resetting of the all-speed governor 40 to a higher speed setting, in which instance the speed governor valve, not shown, opens, allowing an immediate increase in fuel flow to the burner nozzles 16. During such an acceleration the pump 22 and associated by-pass valve 24 functions to maintain a constant discharge pressure in conduit 28 upstream of the speed regulator valve 44, and the speed head regulator 30 functions to establish a metering head across metering restrictions 32 which is always proportional to the square of existing engine speed. Meanwhile, compressor discharge pressure $P_c$ is increasing at a rate dependent upon various engine operating parameters; a portion of the air flow through the engine 10 at pressure $P_c$ flows into the total pressure pick-up 100 and thence through conduit 98 and conduits 120 and 102 to the total compressor inlet pressure pick-up 104 by way of the parallel passages 106 and 108. The bank of bellows 162, 164, 166 and 168 are operatively connected to the control valve 128 and to the passages 108 and 120 in such a manner that the pressure ratio $$\frac{P_x}{P_R}$$

is maintained substantially constant, whereby the linear displacement of control valves 128 and 126 is a predetermined function of existing compressor pressure ratio. The control valve 126 is contoured to vary area $A_4$ of orifice 118 in accordance with a preselected stall function of compressor ratio as said valve is actuated leftwardly with valve 128 during acceleration to decrease area $A_4$ and increase the modulated pressure $P_m$ in accordance with the desired function of compressor ratio and the level of pressure $P_R$. Pressure $P_m$ is communicated to chamber 88 through conduit 92 to collapse bellows 82 and rotate levers 84 and 78 about shaft 80 in a clockwise direction which actuates metering valve 68 leftwardly and increases the area of restrictions 32 in accordance with the predetermined stall function of compressor ratio and aircraft flight conditions. Fuel flow to the engine therefore varies directly as $P_m \cdot N$ (where $P_m$ may equal $$P_R \cdot f_1 \frac{(P_c)}{(P_R)}$$

or $$P_c \cdot f_2 \frac{(P_c)}{(P_R)}$$

depending on suitable control design) during acceleration until the selected speed is attained, at which time the all-speed governor 40 is effective to decrease fuel flow as necessary to run the engine at steady state at the new selected speed. The metering valve 68 controls the quantity of fuel flowing to the engine during acceleration thereof and prior to the attainment of the new selected speed; after the new selected speed is attained the all-speed governor 40 is effective to perform the fuel metering function.

In the interest of structural simplicity and lucidity in the presentation of the operating principles of the applicant's control system, only one embodiment thereof has been shown and described; however, it will be apparent to persons skilled in the art that various changes in form and relative arrangement of parts may be made to suit requirements. For example, the servo mechanism which includes the bank of bellows for controlling actuation of the valve 128 is replaceable by a diaphragm or low spring rate bellows activator if the servo mechanism is found undesirable, whereas the bellows means 82 for controlling the position of the main valve 68 is replaceable by a servo system if the bellows action is found inadequate, and the dynamic response characteristic of control valves 128 and 126 may be improved by application of known servomechanism techniques to the servo-mechanism which controls said valves.

In addition, control valves 126 and 128, if properly contoured, may control upstream orifices in the respective parallel passages of the two series orifices in each passage so long as the pressure ratio $$\frac{P_x}{P_R}$$

is maintained substantially constant. Also, it may be found desirable in some installations to vary pressure $P_m$ according to some predetermined function of compressor ratio by direct measurement of a given fraction thereof, in which instance the total pressure pick-ups 100 and 104 would not be positioned, as shown, at the discharge and inlet sides of the compressor 13 respectively but might, for example, be positioned to pick up the total pressure at the discharge sides of the sixth and second compressor stages respectively.

Furthermore, my invention may be easily modified to produce a scheduled engine deceleration regime, in addition to the accelerating function hereinbefore described. For example, a pilot controlled valve may be operative to restrict area $A_3$ of orifice 122 whenever engine deceleration is demanded, in which instance pressure $P_m$ would decrease to a predetermined low level but would continue to vary as $P_R$ or $P_c$ times some function of compressor ratio, whereby a scheduled rate of engine deceleration would result without danger of, for example, burner die-out. A similar result could easily be realized by venting $P_m$ to $P_R$ through another orifice, not shown, in the lower wall of orifice housing 112 whenever deceleration of the engine was desired.

I claim:

1. In a fuel control system for gas turbine engines having a burner and a compressor, mechanism including a fuel metering restriction for metering fuel to the burner, valve means for controlling said restriction, means operatively connected to said valve means responsive to a fluid pressure and means for modulating said fluid pressure during operation of the engine in such a way that said pressure is a measure of the ratio of pressures across the compressor, combined with means for controlling the fuel metering head across said restriction as a function of engine speed in such a manner that fuel is metered to the burner at said restriction in accordance with the relation $$W_f = P_R N \cdot f_1 \frac{(P_c)}{(P_R)}$$

where $W_f$ denotes fuel flow to the burner, $P_R$ denotes compressor inlet pressure, N represents engine rotational speed, $P_c$ signifies a compressor pressure, and $f_1$ represents predetermined empirical function.

2. In a fuel control system for gas turbine engines having a burner and a compressor, mechanism including a fuel metering restriction for metering fuel to the burner, valve means for controlling said restriction, means operatively connected to said valve means responsive to a fluid pressure and means for modulating said fluid pressure during operation of the engine in such a way that said pressure is a measure of the ratio of pressures across the compressor, combined with means for controlling the fuel metering head across said restriction as a function of engine speed in such a manner that fuel is metered to the burner at said restriction in accordance with the relation $$W_f = P_c N \cdot f_2 \frac{(P_c)}{(P_R)}$$

where $W_f$ denotes fuel flow to the burner, $P_c$ denotes a compressor pressure, N represents engine rotational speed, $P_R$ denotes compressor inlet pressure, and $f_2$ represents a predetermined empirical function.

3. In a fuel control system for gas turbine engines having a burner and a compressor, a first fuel flow regulating means for metering fuel to the burner including a fuel metering restriction and valve means for controlling said restriction, a second fuel flow regulating means for controlling the pressure drop across said first regulating means, engine speed sensing means operatively connected to one of said regulating means for controlling fuel flow to the burner as a function of engine speed, and compressor pressure modulator means operatively connected to the other of said regulating means for controlling fuel flow to the burner as a function of compressor pressure ratio including a conduit arranged to receive air from said compressor, means responsive to the air pressure in said conduit for controlling said regulating means and means for modulating the pressure in said conduit during operation of the engine in such a way that said pressure is a measure of the ratio of pressures across the compressor.

4. In a fuel control system for gas turbine engines, having a burner and a compressor, a first fuel flow regulating means for metering fuel to the burner including a fuel metering restriction, valve means for controlling said restriction, a second fuel flow regulating means for controlling the pressure drop across said first regulating means, engine speed sensing means operatively connected to one of said regulating means for controlling fuel flow to the burner as a function of engine speed, and compressor pressure modulating means operatively connected to the other of said regulating means for controlling fuel flow to the burner as a function of compressor pressure ratio at any given altitude including a modulated pressure chamber, first means connecting said chamber with an air pressure which varies with variations in engine speed, second means connecting said chamber with compressor inlet pressure, said first and second connecting means having orifices of such a predetermined relation that a pressure is produced in said chamber which is a measure of the compressor pressure ratio.

5. In a fuel control system for gas turbine engines having a burner and a compressor, a first fuel flow regulating means for metering fuel to the burner including a fuel metering restriction and valve means for controlling said restriction, a second fuel flow regulating means for controlling the pressure drop across said first regulating means, engine speed sensing means operatively connected to one of said regulating means for controlling fuel flow to the burners as a function of engine speed, and means operatively connected to the other of said regulating means for controlling fuel flow to the burner as a function of compressor pressure ratio including a pressure chamber and means for modulating the pressure in said chamber including a first orifice for connecting said chamber with compressor discharge pressure and a second orifice for connecting said chamber with compressor inlet pressure, said first and second orifices having such a predeterminately controlled area ratio that a pressure is produced in said chamber which is a measure of the compressor pressure ratio throughout the operating range of the engine.

6. In a fuel control system for gas turbine engines having a burner and a compressor, a first fuel flow regulating means for metering fuel to the burner including a fuel metering restriction and valve means for controlling said restriction, a second fuel flow regulating means for controlling the pressure drop across said first regulating means, engine speed sensing means operatively connected to one of said regulating means for controlling fuel flow to the burner proportional to engine speed, and pressure modulator means operatively connected to the other of said regulating means for controlling fuel flow to the burner as a function of compressor pressure ratio including a gas chamber for providing a control pressure, means operatively connected to said regulating means responsive to the control pressure in said gas chamber, and means responsive to a condition other than temperature for modulating the pressure in said chamber in such a manner that said chamber pressure continuously varies as a predetermined function of compressor pressure ratio throughout the operating range of the engine.

7. A fuel control device for gas turbine engines having a burner and a compressor comprising a first fuel flow regulating means for metering fuel to the burner including a fuel metering restriction, valve means adapted to control the effective area of said restriction, a modulated pressure chamber, means responsive to the pressure in said chamber operatively connected to said valve means for controlling the position thereof as a function of said pressure, and a pair of restrictions in series in operative communication with said chamber and having a controlled predetermined area relation for controlling a modulated pressure in said chamber in such a way that the pressure produced therein is a measure of a predetermined function of compressor pressure ratio at all engine operating conditions, and a second fuel flow regulating means for controlling the pressure drop across said metering restriction as a function of engine speed including engine speed sensing means and valve means operatively connected to said speed sensing means, whereby the fuel control device meters fuel during acceleration of the engine at a rate which closely follows the surge or stall characteristic of the compressor.

8. In a fuel control system for gas turbine engines having a burner and a compressor, means for metering fuel to the burner comprising a fuel flow regulating restriction, valve means for controlling said restriction, means for regulating the fuel pressure drop across said restriction, means operatively connected to said valve means responsive to an air pressure, and means including air valve means modulating said air pressure during operation of the engine in such a way that said pressure is a measure of the ratio of pressures across the compressor at any given altitude.

9. In a fuel control system for gas turbine engines having a burner and a compressor, means for controlling the flow of fuel to the burner comprising a flow regulating restriction, valve means for controlling said restriction, means operatively connected to said valve means responsive to a fluid pressure, and a pressure generator for controlling the pressure of the fluid to which said last mentioned means responds to vary as a predetermined function of compressor pressure ratio including a conduit connectable at one end thereof to a source of high pressure fluid in the compressor and at the opposite end thereof to a source of low pressure fluid in the compressor, a flow restriction in said conduit and means operatively associated with said restriction for measuring a predetermined function of the ratio of the pressures at said high and low pressure sources and for modulating said first mentioned fluid pressure.

10. In a fuel control system for gas turbine engines having a burner and a compressor, means for metering fuel to the burner comprising a fuel metering restriction, valve means for controlling said restriction, a fluid pressure responsive means operatively connected to said valve means, and a pressure generator for controlling the pressure of the fluid to which said pressure responsive means responds to vary as a predetermined function of compressor pressure ratio including a conduit connectable at one end thereof to a source of high pressure fluid in the compressor and at the opposite end thereof to a source of low pressure fluid in the compressor, a flow restriction in said conduit, displaceable valve means controlling said restriction, and mechanism controlling said valve means in such a manner that the displacement thereof is a function of the ratio of the pressures at said high and low pressure sources.

11. In a fuel control system for gas turbine engines having a burner and a compressor, means for controlling the flow of fuel to the burner comprising a flow regulating orifice, valve means for controlling said orifice, fluid pressure responsive means operatively connected to said valve means, and a pressure generator for controlling the pressure of the fluid to which said pressure responsive means responds to vary as a predetermined function of compressor pressure ratio including a conduit connectable at one end thereof to a source of high pressure fluid in the compressor and at the opposite end thereof to a source of low pressure fluid in the compressor, a flow restriction in said conduit, valvular means for controlling the effective area of said restriction, and means for controlling the position of said valvular means including servo mechanism operatively connected thereto in such a manner that a substantially constant predetermined pressure ratio is maintained across said flow restriction.

12. In a fuel control system for gas turbine engines having a burner and a compressor, means for controlling the flow of fuel to the burner comprising a flow regulating restriction, valve means for controlling said restriction, fluid pressure responsive means operatively connected to said valve means, and a pressure generator for controlling the pressure of the fluid to which said pressure responsive means responds to vary as a predetermined function of compressor pressure ratio including a conduit connectable at one end thereof to a source of high pressure fluid in the compressor and at the opposite end thereof to a source of low pressure fluid in the compressor, valvular means for controlling the effective area of said restriction, and means for actuating said valvular means in such a manner that any given increment of displacement thereof is a predetermined function of a change in the ratio of the pressures at said high and low pressure sources.

13. In a fuel control system for gas turbine engines having a burner and a compressor, means for controlling the flow of fuel to the burner comprising a flow regulating restriction, valvular means for controlling said restriction, fluid pressure responsive means operatively connected to said valvular means, and a pressure generator for controlling said fluid pressure as a predetermined function of compressor pressure ratio including a conduit connectable at one end thereof to compressor discharge pressure and at the opposite end thereof to compressor inlet pressure, an orifice in said conduit, valve means for controlling the effective area of said orifice, servo motor means connected to said valve means for controlling the position thereof, servo valve means for controlling said motor means, first pressure responsive means communicating with said conduit upstream of said orifice and second pressure responsive means communicating with said conduit downstream of said orifice, said first and second pressure responsive means being operatively connected to said valve means through said servo valve means in such a manner that said valve means controls the effective area of said orifice to maintain a predetermined and substantially constant pressure ratio thereacross, whereby the position of said valve means varies as a predetermined function of the compressor pressure ratio.

14. In a fuel control system for gas turbine engines having a burner and a compressor, means for metering fuel to the burner comprising, a fuel metering orifice, valvular means for controlling said orifice, fluid pressure responsive means operatively connected to said valvular means, and means for controlling said fluid pressure as a predetermined function of the ratio of pressures across the compressor including a conduit connectable at one end thereof to a source of high pressure fluid in the compressor and at the opposite end thereof to a source of low pressure fluid in the compressor, a flow restriction in said conduit, and means operatively connected to said conduit and to said flow restriction including a displaceable member controlling said restriction for controlling the fluid pressure upstream thereof in such a manner that any given increment of displacement of said member is a predetermined function of the ratio of pressures across said high and low pressure sources.

15. In a fuel control system for gas turbine engines having a burner and a compressor, means for metering fuel to the burner comprising means defining a chamber, first means connecting said chamber with a compressor pressure, second means connecting said chamber with compressor inlet pressure, said first and second connecting means being in series flow relationship and having such a predetermined relation that a pressure is continuously produced in said chamber which is a measure of a predetermined function of compressor pressure ratio and fuel flow regulating means responsive to the pressure in said chamber.

16. In a fuel control system for gas turbine engines having a burner and a compressor, means for metering fuel to the burner comprising fuel flow regulating means, pressure responsive means operatively connected to said flow regulating means, said pressure responsive means being disposed in a chamber, first means connecting said chamber with compressor discharge pressure including an orifice, second means connecting said chamber with compressor inlet pressure including an orifice, said orifices being in series flow relationship and having such a controlled area relation that a pressure is continuously produced in said chamber which is a measure of the compressor pressure ratio, whereby said flow regulating means regulates the flow of fuel to the burners as a predetermined function of compressor pressure ratio.

17. In a fuel control system for gas turbine engines having a burner and a compressor, means for regulating the flow of fluid to the burner, a fuel restriction, valve means for controlling said restriction, fluid pressure responsive means operatively connected to said valve means, and means for controlling the fluid pressure to which said latter means responds to vary as a predetermined function of a compressor pressure ratio including a conduit connectable at one end thereof to a source of high pressure fluid in the compressor and at the opposite end thereof to a source of low pressure fluid in the compressor, movable means for controlling the flow of fluid through said conduit, and mechanism operatively connected to said movable means and to said conduit on opposite sides of said movable means for controlling the flow regulating function thereof in such a manner that the displacement of said movable means is a predetermined function of the pressure ratio across said high and low pressure sources.

18. In a fuel control system for gas turbine engines having a burner and a compressor, means for metering fuel to the burner comprising a fuel flow regulating orifice, valve means for controlling said orifice, and a pressure generator operatively connected to said valve means for controlling the flow regulating function thereof and for modulating a fluid pressure to vary as a predetermined function of compressor pressure ratio including a conduit connectable at one end thereof to a source of compressor discharge pressure and at the opposite end thereof to a source of compressor inlet pressure, a first flow restriction in said conduit, a second flow restriction in said conduit downstream of said first restriction, area control means associated with one of said restrictions for maintaining a substantially constant pressure ratio across one of said restrictions, and means operatively connected to said area control means and responsive to the pressure ratio across one of said restrictions for varying the displacement of said area control means as a predetermined function of the ratio of pressures across said compressor.

19. In a fuel control system for gas turbine engines having a burner and a compressor, means for controlling the flow of fuel to the burner comprising a fuel flow regulating orifice, valve means for controlling said orifice and a pressure ratio measuring device operatively connected to said valve means for controlling the flow regulating function thereof including a conduit means connectable at one end thereof to compressor discharge pressure and at the opposite end thereof to compressor inlet pressure, a first flow restriction in said conduit, a second flow restriction in said conduit, valve means controlling at least one of said restrictions for varying the pressure in said conduit as a predetermined function of compressor pressure ratio and means responsive to the pressure ratio across one of said restrictions and operatively connected to said valve means for controlling the displacement thereof as a predetermined function of the pressure ratio across said compressor.

20. In a fuel control system for gas turbine engines having a burner and compressor, means for controlling the flow of fuel to the burner comprising a fuel flow regulating orifice, valve means for controlling said orifice, and a pressure ratio measuring device operatively connected to said valve means for controlling the flow regulating function thereof including a conduit means connectable at one end thereof to compressor discharge pressure and at the opposite end thereof to compressor inlet pressure, a flow restriction in said conduit, and means operatively associated with said restriction for controlling a pressure in said conduit to vary as a predetermined function of compressor pressure ratio.

21. In a fuel control system for gas turbine engines having a burner and a compressor, means for controlling the flow of fuel to the burner comprising a fuel flow regulating orifice, valve means for controlling said orifice and a pressure ratio measuring device operatively connected to said valve means for controlling the flow regulating action thereof as a predetermined function of compressor ratio including a conduit connectable at one end thereof to a source of high pressure fluid in the compressor and at the opposite end thereof to a source of low pressure fluid in the compressor, a first flow restriction in said conduit, a second flow restriction in said conduit in parallel with said first flow restriction, connected first and second valvular means for controlling the effective area of said first and second restrictions respecively, and means responsive to the pressure ratio across one of said restrictions for controlling the area regulating position of said first and second valvular means.

22. In a fuel control system for gas turbine engines having a burner and a compressor, means for controlling the flow of fuel to the burner comprising a fuel flow regulating orifice, valve means for controlling said orifice and a pressure ratio measuring device operatively connected to said valve means for controlling the flow regulating function thereof including a conduit connectable at one end thereof to a source of high pressure fluid in the compressor and at the opposite end thereof to a source of low pressure fluid in the compressor, first and second flow restrictions in said conduit, valvular means controlling at least one of said restrictions, a pressure responsive member communicating with said conduit upstream of one of said restrictions, another pressure responsive member communicating with said conduit downstream of said last mentioned restriction, and means operatively connecting both of said pressure responsive members to said valvular means in such a manner that said valvular means controls the fluid pressure upstream thereof to vary as a function of the existing ratio of pressures across said high and low pressure sources.

23. In a fuel control system for gas turbine engines having a burner and a compressor, means for controlling the flow of fuel to the burner comprising a fuel flow regulating orifice, valve means for controlling said orifice, fluid pressure responsive means operatively connected to said valve means for effecting control thereof, and a pressure ratio measuring device for modulating the pressure of the fluid to which said pressure responsive means reacts including a conduit connectable at one end thereof to compressor discharge pressure and at the opposite end thereof to compressor inlet pressure, a first restriction in said conduit, a second restriction in said conduit in parallel with said first restriction, contoured valvular means for controlling the effective area of at least one of said restrictions, and means responsive to the pressure ratio across one of said restrictions for controlling the displacement of said valvular means as a predetermined function of compressor ratio, whereby the fluid pressure to which said pressure responsive means reacts varies as a predetermined function of compressor pressure ratio.

24. In a fuel control system for gas turbine engines having a burner and a compressor, a fuel conduit for supplying metered fuel to the burner, means in said conduit for controlling the flow of fuel therethrough, a device responsive to a modulated fluid pressure for controlling said means, and means for modulating said fluid pressure including a conduit connectable at one end thereof to a source of high pressure fluid in the compressor and at the opposite end thereof to a source of low pressure fluid in the compressor, a first restriction in said conduit, valvular means controlling said restriction, means for controlling the displacement of said valvular means as a predetermined function of the ratio of the pressures across said high and low pressure sources, a second restriction in said conduit in parallel with said first restriction, contoured valvular means for controlling said second restriction connected to said first mentioned valvular means for controlling said modulated fluid pressure as a function of the pressure at said low pressure fluid source times the predetermined function of the ratio of pressures across said high and low pressure fluid sources.

25. In a fuel control system for gas turbine engines having a burner and a compressor, a main fuel conduit for supplying metered fuel to said burner, fuel flow regulating means in said conduit responsive to a modulated fluid pressure, and means for modulating said fluid pressure including a conduit connectable at one end thereof to a source of high pressure fluid in the compressor and at the opposite end thereof to a source of low pressure fluid in the compressor, a first restriction in said conduit, valvular means for controlling said restriction, means for controlling said valvular means as a function of a predetermined ratio of the pressures across said high and low pressure fluid sources, a second restriction in said conduit in parallel with said first restriction, contoured valvular means for controlling said second restriction connected to said first valvular means for modulating said fluid pressure in such a manner that said pressure varies as a function of the pressure at said high pressure fluid source times a predetermined function of the ratio of pressures across said high and low pressure fluid sources.

26. In a fuel control system for gas turbine engines having a burner and a compressor, a fuel conduit for supplying metered fuel to said burner, means for controlling the flow of fuel through said conduit responsive to a modulated fluid pressure, and means for modulating said fluid pressure including a conduit connectable at one end thereof to a source of high pressure fluid in the compressor and at the opposite end thereof to a source of low pressure fluid in the compressor, parallel flow paths in said conduit, a flow restrictor in each of said parallel paths, valvular means for controlling each of said restrictions, and means for displacing said valvular means in such a manner that said first mentioned fluid pressure is modulated to vary as a predetermined function of the ratio of pressures across said high and low pressure sources.

27. In a fuel control system for gas turbine engines having a burner and a compressor, a fuel conduit for supplying metered fuel to said burner, means responsive to a modulated fluid pressure for controlling the flow of fuel through said conduit, and means for modulating said fluid pressure to vary as a predetermined function of compressor pressure ratio including a conduit connectable at one end thereof to compressor discharge pressure and at the opposite end thereof to compressor inlet pressure, parallel flow paths in said conduit, first and second series restrictions in each of said parallel flow passages, a valvular means in each of said parallel flow passages for controlling one of said restrictions in each of said passages operatively interconnected to each other, and means for controlling each of said valvular means and for modulating said fluid pressure as a predetermined function of the ratio of pressures across said compressor.

28. In a fuel control system for gas turbine engines having a burner and a compressor, means for metering fuel to the burner during acceleration of the engine at a rate which closely follows the compressor stall limit irrespective of variations in engine operating conditions comprising a fuel conduit for supplying metered fuel to the burner, means in said conduit for varying the flow of fuel to the burner as a function of engine speed, means in said conduit for also varying the fuel flow to the burner as a function of a modulated fluid pressure, and means for modulating said fluid pressure to vary as a predetermined function of compressor pressure ratio including a passage connectable at one end thereof to a source of high pressure fluid in the compressor and at the opposite end thereof to a source of low pressure fluid in the compressor, a modulated pressure fluid chamber in said conduit, a restriction in said conduit, valvular means controlling said restriction for modulating the fluid pressure in said chamber, and means operatively connected to said valvular means for controlling said valvular means in such a manner that the fluid pressure in said chamber is modulated to vary as a predetermined function of the ratio of pressures across said high and low pressure fluid sources.

29. In a fuel control system for gas turbine engines having a burner and a compressor, a fuel conduit for supplying metered fuel to the burner, means in said conduit for controlling the flow of fuel therethrough, a device responsive to a modulated fluid pressure for controlling said means, and means for modulating said fluid pressure in such a manner that said fluid pressure varies in proportion to the fluid pressure at the inlet of the compressor times a predetermined compressor surge or stall function of the ratio of fluid pressures across the compressor.

30. In a fuel control system for gas turbine engines having a burner and a compressor, a fuel conduit for supplying metered fuel to the burner, means in said conduit for controlling the flow of fuel therethrough, a device responsive to a modulated fluid pressure for controlling said means, and means for modulating said fluid pressure in such a manner that said fluid pressure varies in proportion to the fluid pressure at the inlet of the compressor times a predetermined compressor surge or stall function of the ratio of fluid pressures across the compressor, including a conduit connectable at one end thereof to a source of low pressure fluid in the compressor and at the opposite end thereof to a source of high pressure fluid in the compressor.

References Cited in the file of this patent

UNITED STATES PATENTS

| | | |
|---|---|---|
| 2,643,513 | Lee | June 30, 1953 |
| 2,643,514 | Jubb | June 30, 1953 |
| 2,667,743 | Lee | Feb. 2, 1954 |
| 2,668,414 | Lee | Feb. 9, 1954 |
| 2,668,416 | Lee | Feb. 9, 1954 |
| 2,670,599 | Davies et al. | Mar. 2, 1954 |

UNITED STATES PATENT OFFICE
Certificate of Correction

Patent No. 2,848,869                                      August 26, 1958

Daniel G. Russ

It is hereby certified that error appears in the printed specification of the above numbered patent requiring correction and that the said Letters Patent should read as corrected below.

Column 15, lines 17 and 18, for "respecively" read —respectively—; column 16, line 41, for "restrictor" read —restriction—.

Signed and sealed this 28th day of April 1959.

[SEAL]

Attest:
T. B. MORROW,
*Attesting Officer.*

ROBERT C. WATSON,
*Commissioner of Patents.*